(12) United States Patent
Bates

(10) Patent No.: US 10,467,288 B2
(45) Date of Patent: Nov. 5, 2019

(54) AUDIO CONTENT SEARCH OF REGISTERED AUDIO CONTENT SOURCES IN A MEDIA PLAYBACK SYSTEM

(71) Applicant: Sonos, Inc., Santa Barbara, CA (US)

(72) Inventor: Paul Andrew Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 37 days.

(21) Appl. No.: 14/956,926

(22) Filed: Dec. 2, 2015

(65) Prior Publication Data

US 2016/0092560 A1    Mar. 31, 2016

Related U.S. Application Data

(63) Continuation of application No. 14/041,891, filed on Sep. 30, 2013.

(51) Int. Cl.
| | | |
|---|---|---|
| *G06F 16/68* | (2019.01) | |
| *G06F 16/2457* | (2019.01) | |
| *G06F 16/638* | (2019.01) | |
| *G06F 16/28* | (2019.01) | |
| *G06F 3/0482* | (2013.01) | |
| *H04L 29/06* | (2006.01) | |

(52) U.S. Cl.
CPC ......... *G06F 16/686* (2019.01); *G06F 3/0482* (2013.01); *G06F 16/24578* (2019.01); *G06F 16/285* (2019.01); *G06F 16/639* (2019.01); *G06F 16/68* (2019.01); *H04L 65/60* (2013.01)

(58) Field of Classification Search
CPC ......... G06F 17/30752; G06F 17/30864; G06F 21/10; G06F 16/686; G06Q 30/06; H04M 1/7253; H04N 7/15; H04L 47/36
See application file for complete search history.

(56) References Cited

U.S. PATENT DOCUMENTS

| | | | |
|---|---|---|---|
| 5,440,644 | A | 8/1995 | Farinelli et al. |
| 5,616,876 | A | 4/1997 | Cluts |
| 5,761,320 | A | 6/1998 | Farinelli et al. |
| 5,848,410 | A | 12/1998 | Walls et al. |
| 5,859,638 | A | 1/1999 | Coleman et al. |

(Continued)

FOREIGN PATENT DOCUMENTS

| | | |
|---|---|---|
| CN | 102550039 A | 7/2012 |
| EP | 1389853 A1 | 2/2004 |

(Continued)

OTHER PUBLICATIONS

"AudioTron Quick Start Guide, Version 1.0", Voyetra Turtle Beach, Inc., Mar. 2001, 24 pages.

(Continued)

*Primary Examiner* — Etienne P Leroux
(74) *Attorney, Agent, or Firm* — McDonnell Boehnen Hulbert & Berghoff LLP

(57) ABSTRACT

Embodiments are described herein that provide searches, including a multi-dimensional search, a cross-source search, or both in a media playback system. The search can be initiated by way of a selection of a location on user interface of a controller. The location corresponds to one or more metadata that is used in the search. Results are sorted and displayed. In some embodiments, metadata is used to filter and/or sort the results.

21 Claims, 17 Drawing Sheets

(56) References Cited

U.S. PATENT DOCUMENTS

| | | |
|---|---|---|
| 5,923,902 A | 7/1999 | Inagaki |
| 6,025,838 A | 2/2000 | Bardon et al. |
| 6,032,202 A | 2/2000 | Lea et al. |
| 6,256,554 B1 | 7/2001 | Dilorenzo |
| 6,288,718 B1 | 9/2001 | Laursen et al. |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,760,721 B1 | 7/2004 | Chasen et al. |
| 6,778,869 B2 | 8/2004 | Champion |
| 6,971,069 B2 | 11/2005 | Laiho et al. |
| 6,985,694 B1 | 1/2006 | De Bonet et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,305,624 B1 | 12/2007 | Siegel |
| 7,391,791 B2 | 6/2008 | Balassanian et al. |
| 7,483,538 B2 | 1/2009 | McCarty et al. |
| 7,483,958 B1* | 1/2009 | Elabbady ............... G06F 21/10 709/217 |
| 7,545,440 B2 | 6/2009 | Kim et al. |
| 7,560,637 B1 | 7/2009 | Robbin et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,742,740 B2 | 6/2010 | Goldberg et al. |
| 7,788,582 B2 | 8/2010 | Robbin et al. |
| 7,853,341 B2 | 12/2010 | McCarty et al. |
| 7,890,520 B2 | 2/2011 | Tsukazaki et al. |
| 7,956,272 B2 | 6/2011 | Wysocki et al. |
| 7,987,294 B2 | 7/2011 | Bryce et al. |
| 8,014,423 B2 | 9/2011 | Thaler et al. |
| 8,017,852 B2 | 9/2011 | Yamashita et al. |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,234,395 B2 | 7/2012 | Millington et al. |
| 8,276,076 B2 | 9/2012 | Torrens et al. |
| 8,483,853 B1 | 7/2013 | Lambourne |
| 8,634,944 B2 | 1/2014 | Bull et al. |
| 8,683,378 B2 | 3/2014 | Bull et al. |
| 8,766,079 B2 | 7/2014 | Utsuki et al. |
| 8,942,252 B2 | 1/2015 | Balassanian et al. |
| 8,954,855 B2 | 2/2015 | Shirai et al. |
| 8,977,963 B1 | 3/2015 | Joyce et al. |
| 9,529,979 B2 | 12/2016 | Torgerson et al. |
| 9,547,647 B2 | 1/2017 | Badaskar et al. |
| 9,614,951 B2* | 4/2017 | Nurmi ............... H04M 1/7253 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0059363 A1 | 5/2002 | Katz et al. |
| 2002/0124097 A1 | 9/2002 | Isely et al. |
| 2002/0147977 A1 | 10/2002 | Hammett et al. |
| 2002/0152278 A1* | 10/2002 | Pontenzone ........... H04H 20/42 709/217 |
| 2003/0013493 A1 | 1/2003 | Irimajiri et al. |
| 2003/0157951 A1 | 8/2003 | Hasty |
| 2004/0024478 A1 | 2/2004 | Hans et al. |
| 2004/0113952 A1 | 6/2004 | Randall |
| 2004/0252119 A1 | 12/2004 | Hunleth et al. |
| 2005/0154988 A1 | 7/2005 | Proehl et al. |
| 2006/0026535 A1 | 2/2006 | Hotelling et al. |
| 2006/0036942 A1 | 2/2006 | Carter et al. |
| 2006/0095780 A1* | 5/2006 | Hillis ................. H04L 63/083 713/182 |
| 2006/0095848 A1 | 5/2006 | Naik |
| 2006/0123357 A1 | 6/2006 | Okamura |
| 2006/0156239 A1 | 7/2006 | Jobs et al. |
| 2006/0173825 A1 | 8/2006 | Hess et al. |
| 2006/0218209 A1 | 9/2006 | Arrouye et al. |
| 2006/0271870 A1 | 11/2006 | Anwar |
| 2006/0282858 A1 | 12/2006 | Csicsatka et al. |
| 2007/0016314 A1 | 1/2007 | Chan et al. |
| 2007/0033228 A1 | 2/2007 | Fassett et al. |
| 2007/0055654 A1* | 3/2007 | Robbin ............. G06F 17/30749 |
| 2007/0083556 A1 | 4/2007 | Plastina et al. |
| 2007/0083822 A1 | 4/2007 | Robbin et al. |
| 2007/0142944 A1 | 6/2007 | Goldberg et al. |
| 2007/0150830 A1 | 6/2007 | Ording et al. |
| 2007/0156648 A1 | 7/2007 | Bridges et al. |
| 2007/0168875 A1 | 7/2007 | Kowitz et al. |
| 2007/0220430 A1 | 9/2007 | Sato |
| 2007/0248311 A1 | 10/2007 | Wice et al. |
| 2007/0281606 A1 | 12/2007 | Baunach |
| 2008/0040687 A1 | 2/2008 | Randall |
| 2008/0086539 A1 | 4/2008 | Bloebaum et al. |
| 2008/0209063 A1* | 8/2008 | Lee .................. H04L 29/06027 709/231 |
| 2008/0243788 A1 | 10/2008 | Reztlaff et al. |
| 2008/0249982 A1 | 10/2008 | Lakowske |
| 2009/0158196 A1 | 6/2009 | Crystal |
| 2010/0023578 A1* | 1/2010 | Brant ................ G06F 17/30749 709/203 |
| 2010/0042595 A1* | 2/2010 | Chen .................... G11B 27/105 707/728 |
| 2010/0100839 A1 | 4/2010 | Tseng et al. |
| 2011/0143653 A1 | 6/2011 | Lane et al. |
| 2011/0225150 A1 | 9/2011 | Whitman |
| 2011/0276567 A1* | 11/2011 | Asikainen ......... G06F 17/30743 707/728 |
| 2011/0307460 A1* | 12/2011 | Vadlamani ........ G06F 17/30864 707/706 |
| 2012/0088477 A1 | 4/2012 | Cassidy |
| 2012/0089910 A1* | 4/2012 | Cassidy ................ H04L 47/36 715/716 |
| 2012/0137325 A1* | 5/2012 | Ogilvie ................ H04N 7/15 725/38 |
| 2013/0024547 A1 | 1/2013 | Saito et al. |
| 2013/0047087 A1 | 2/2013 | Yamahara et al. |
| 2013/0115877 A1 | 5/2013 | Bloebaum et al. |
| 2013/0174204 A1 | 7/2013 | Coburn, IV et al. |
| 2013/0198268 A1 | 8/2013 | Hyman |
| 2013/0198632 A1 | 8/2013 | Hyman |
| 2013/0268522 A1 | 10/2013 | Barrett |
| 2013/0322648 A1* | 12/2013 | Chukka ................ H04L 65/60 381/77 |
| 2013/0325850 A1* | 12/2013 | Redmond ......... G06F 17/30864 707/722 |
| 2014/0074846 A1 | 3/2014 | Moss et al. |
| 2014/0373041 A1* | 12/2014 | Yan ..................... G06Q 30/06 725/27 |
| 2015/0149901 A1 | 5/2015 | Otto et al. |

FOREIGN PATENT DOCUMENTS

| | | |
|---|---|---|
| JP | 2005284574 A | 10/2005 |
| JP | 2005331681 A | 12/2005 |
| JP | 2007018559 A | 1/2007 |
| JP | 2013025555 A | 2/2013 |
| JP | 2013161511 A | 8/2013 |
| KR | 20090017795 | 2/2009 |
| WO | 2001/53994 A2 | 7/2001 |
| WO | 2003093950 A2 | 11/2003 |
| WO | 2013118472 A1 | 8/2013 |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc Scatternet for affordable and highly functional wireless connectivity" Core, Version 1.0 A, Jul. 26, 1999, 1068 pages.

US 10,467,288 B2
Page 3

(56) References Cited

OTHER PUBLICATIONS

Bluetooth. "Specification of the Bluetooth System: Wireless connections made easy" Core, Version 1.0 B, Dec. 1, 1999, 1076 pages.
Dell, Inc. "Dell Digital Audio Receiver: Reference Guide" Jun. 2000, 70 pages.
Dell, Inc. "Start Here" Jun. 2000, 2 pages.
Final Office Action dated Nov. 27, 2015, issued in connection with U.S. Appl. No. 14/041,891, filed Sep. 30, 2013, 29 pages.
International Searching Authority, International Search Report dated Dec. 17, 2014, issued in connection with International Application No. PCT/US2014/055597, 3 pages.
International Searching Authority, Written Opinion dated Dec. 17, 2014, issued in connection with International Application No. PCT/US2014/055597, filed Sep. 15, 2014, 4 pages.
Jo, J. et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
kayak.com., "Kayak.com search results", Printed Sep. 23, 2013, 3 pages.
Louderback, Jim, "Affordable Audio Receiver Furnishes Homes With MP3" TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
Prismiq; Inc., "Prismiq Media Player User Guide", 2003, 44 pages.
roku.com., "Introducing Roku Search", Oct. 29, 2012, 4 pages.
UPnP; "Universal Plug and Play Device Architecture"; Jun. 8, 2000; version 1.0; Microsoft Corporation; pp. 1-54.
Anonymous, "Screenshots—Clementine Music Player," 2013, XP055306988, retrieved from the internet: URL:https://web.archive.org/web/20130928211339/http://www.clementine-player.org/screenshots, 6 pages.
European Patent Office, Extended European Search Report dated Oct. 13, 2016, issued in connection with European patent application No. 14849768.8, 12 pages.
Herskowitz, Jason, "Tomahawk 0.3," Vimeo, 2011, XP055307358, 2 pages.
Klosowski, Thorin, "How to Merge Multiple Music Services into a Mega-Library with Tomahawk," 2013, XP055306977, 8 pages.
Sonos The Wireless HiFiSystem, "Sonos Controller for iPhone Product Guide," 2013, XP055306996, 46 pages.
Wilson, Mark, "Access all of Your Streaming Music in One Place with Tomahawk," 2013, XP055306952, 4 pages.
Final Office Action dated Nov. 18, 2016, issued in connection with U.S. Appl. No. 14/041,891, filed Sep. 30, 2013, 41 pages.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Preliminary Report on Patentability dated Apr. 14, 2016, issued in connection with International Application No. PCT/US2014/055597, filed Sep. 15, 2014, 6 pages.
Non-Final Office Action dated Apr. 19, 2016, issued in connection with U.S. Appl. No. 14/041,891, filed Sep. 30, 2013, 33 pages.
Advisory Action dated Jan. 30, 2017, issued in connection with U.S. Appl. No. 14/041,891, filed Sep. 30, 2013, 9 pages.
European Patent Office, Office Action dated Sep. 15, 2017, issued in connection with European Application No. 14849768.8, 6 pages.
Final Office Action dated Aug. 8, 2017, issued in connection with U.S. Appl. No. 14/041,891, filed Sep. 30, 2013, 46 pages.
Japanese Patent Office, Full English Translation of Office Action dated May 9, 2017, issued in connection with Japanese Patent Application No. 2016-518763, 14 pages.
Japanese Patent Office, Office Action dated May 9, 2017, issued in connection with Japanese Patent Application No. 2016-518763, 16 pages.
Non-Final Office Action dated Jun. 7, 2017, issued in connection with U.S. Appl. No. 14/956,926, filed Dec. 2, 2015, 40 pages.
Non-Final Office Action dated Mar. 22, 2017, issued in connection with U.S. Appl. No. 14/041,891, filed Sep. 30, 2013, 41 pages.
Non-Final Office Action dated Nov. 29, 2017, issued in connection with U.S. Appl. No. 14/041,891, filed Sep. 30, 2013, 51 pages.
Chinese Patent Office, First Office Action and Search Report dated Dec. 20, 2018, issued in connection with Chinese Application No. 201480053808.4, 17 pages.
European Patent Office, Summons to Attend Oral Proceedings dated Aug. 14, 2018, issued in connection with European Application No. 14849768.8, 11 pages.
Final Office Action dated Mar. 19, 2018, issued in connection with U.S. Appl. No. 14/956926, filed Dec. 2, 2015, 29 pages.
Francis D'sa: How to: Stream PC audio to your Android device via Wi-Fi, Aug. 13, 2013, XP055486390, https://www.firstpost.com/tech/news-analysis/how-to-stream-pc-audio-to-your-android-device-via-wi-fi . . ., 4 pages.
Japanese Patent Office, Office Action dated May 14, 2019, issued in connection with Japanese Patent Application No. 2017-228115, 7 pages.
Japanese Patent Office, Office Action dated Dec. 4, 2018, issued in connection with Japanese Application No. 2017-228115, 7 pages.
Japanese Patent Office, Office Action Translation dated May 14, 2019, issued in connection with Japanese Patent Application No. 2017-228115, 4 pages.
Japanese Patent Office, Office Action Translation dated Dec. 4, 2018, issued in connection with Japanese Application No. 2017-228115, 3 pages.
Mr. PC. Sep. 24, 2013, vol. 4, No. 11, P.72, Shinyusha Co., Ltd, Non-Patent Literature Document cited in 2017-228115 OA dated Dec. 4, 2018, 16 pages.
Non-Final Office Action dated Nov. 8, 2018, issued in connection with U.S. Appl. No. 14/956,926, filed Dec. 2, 2015, 29 pages.
Notice of Allowance dated Jul. 23, 2018, issued in connection with U.S. Appl. No. 14/041,891, filed Sep. 30, 2013, 18 pages.
Notice of Allowance dated Mar. 4, 2019, issued in connection with U.S. Appl. No. 14/956,926, filed Dec. 2, 2015, 7 pages.
"Softlog" [online], Feb. 15, 2013, Internet http://softblog.blog17.fc2.com/blog-entry-167.html, 7 pages.
www.gizmodo.jp/2012/03/post_10053.html, Non-Patent Literature Document cited in 2017-228115 OA dated Dec. 4, 2018, 16 pages.

\* cited by examiner

AUDIO CONTENT SEARCH OF REGISTERED AUDIO CONTENT SOURCES IN A MEDIA PLAYBACK SYSTEM

CROSS REFERENCE TO RELATED APPLICATIONS

This application claims priority under 35 U.S.C. § 120 to, and is a continuation of, U.S. Non-Provisional patent application Ser. No. 14/041,891, filed on Sep. 30, 2013, entitled "Audio Content Search in a Media Playback System," which is incorporated herein by reference.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
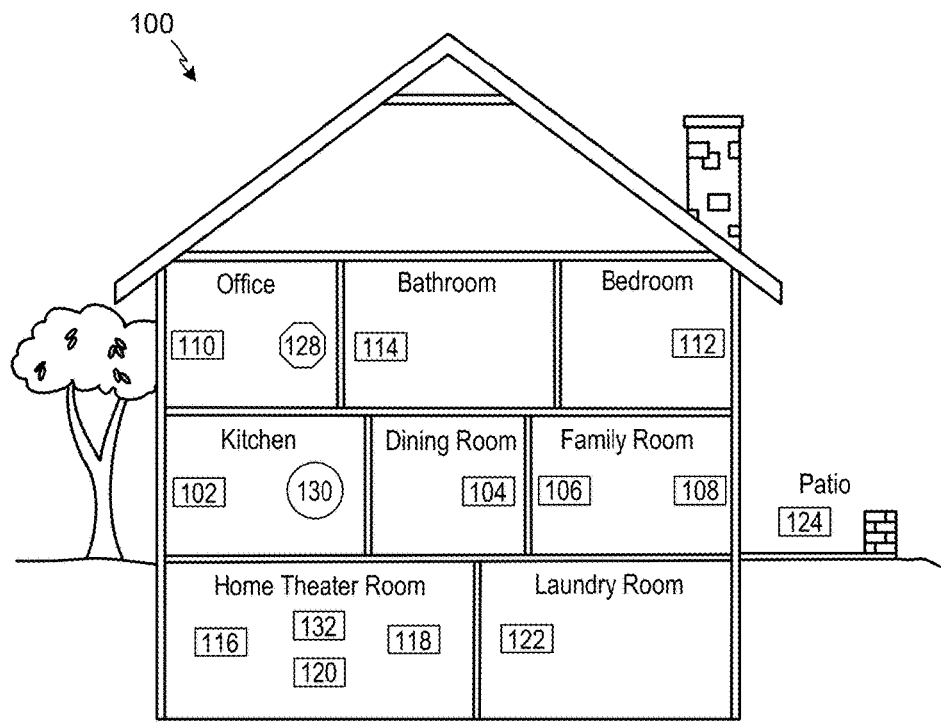
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein involve a user friendly system for audio discovery using a controller of a media playback system. The embodiments are particularly useful when listening to a song via a media playback system and the listener user wants to track down the song. For instance, selecting a location on a user interface causes a search to be performed. Depending on the embodiment, the search may include searching one or more audio sources (e.g., a cross-service search), the search may include the use of metadata, the search may include the use both metadata and a cross-service search. The results are sorted and displayed. Various embodiments are described below in detail as they relate to different aspects of the search.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. Zone players 102-124, also referred to herein as playback devices, multimedia units, speakers, players, and so on, provide audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
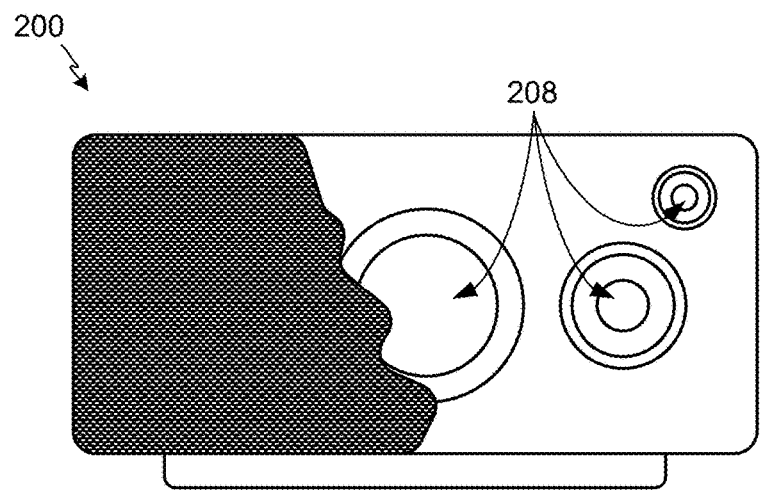
FIG. 2A shows an illustration of an example zone player having a built-in amplifier and transducers.
Figure 2B:
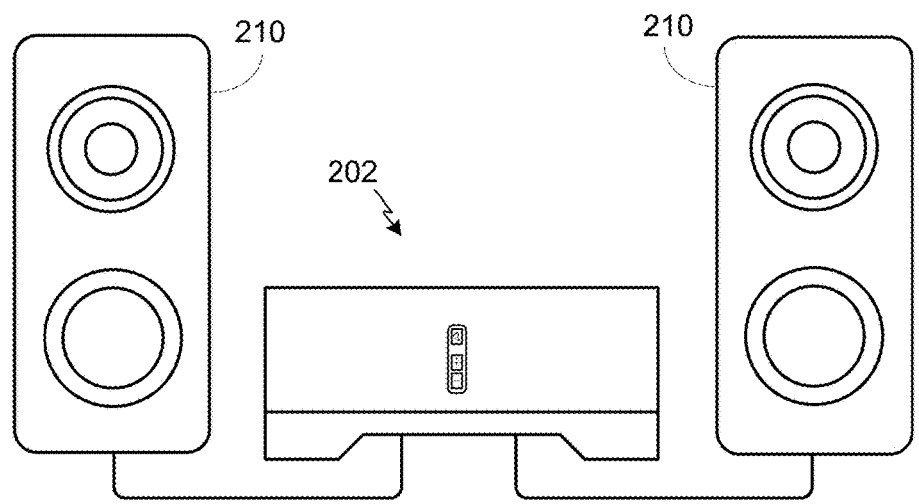
FIG. 2B shows an illustration of an example zone player having a built-in amplifier and connected to external speakers.
Figure 2C:
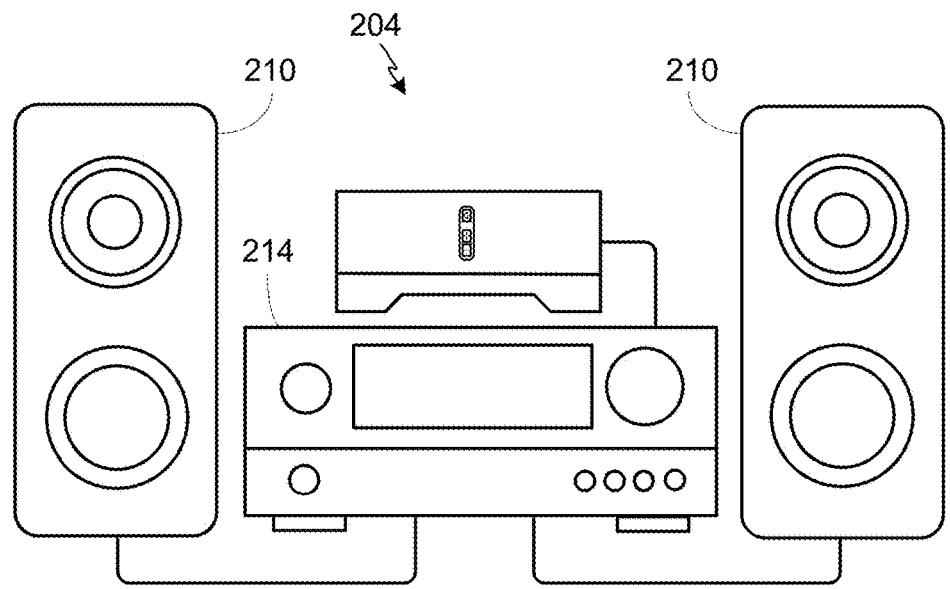
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates a zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the media content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
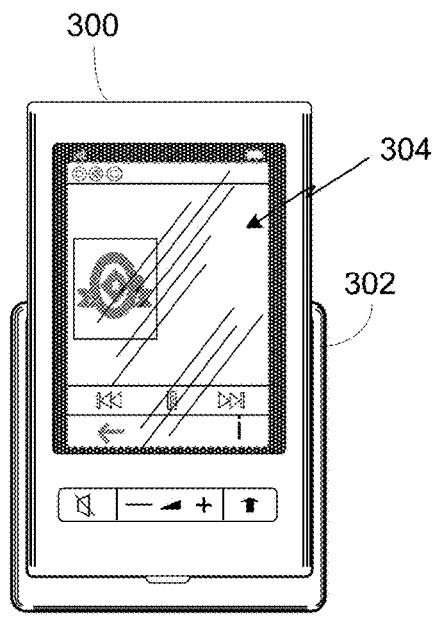
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Zone players 102-124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" contains two or more zone players, such as the two zone players 106 and 108 in the family room, whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
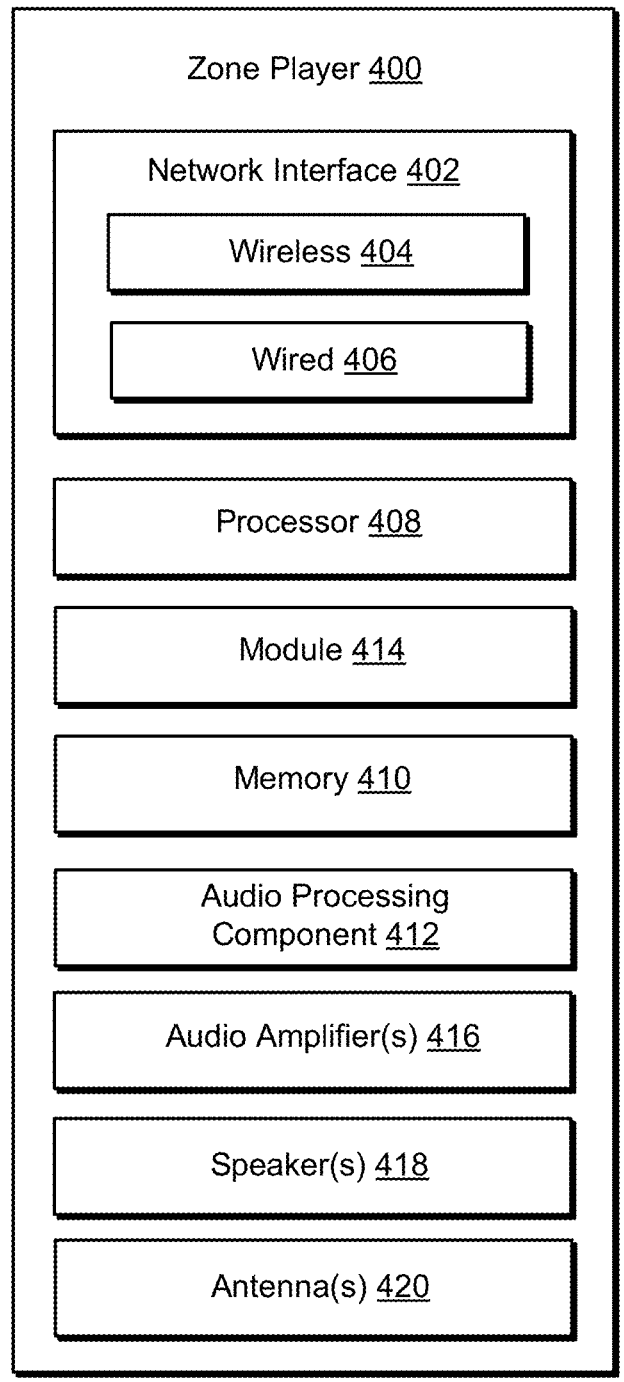
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
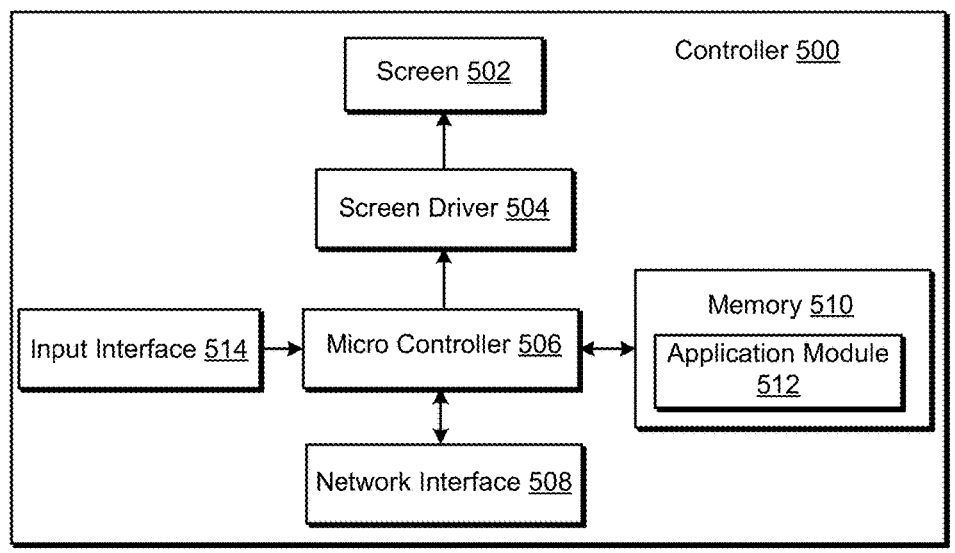
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group to facilitate synchronized playback amongst the zone players in the zone group. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smart phone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
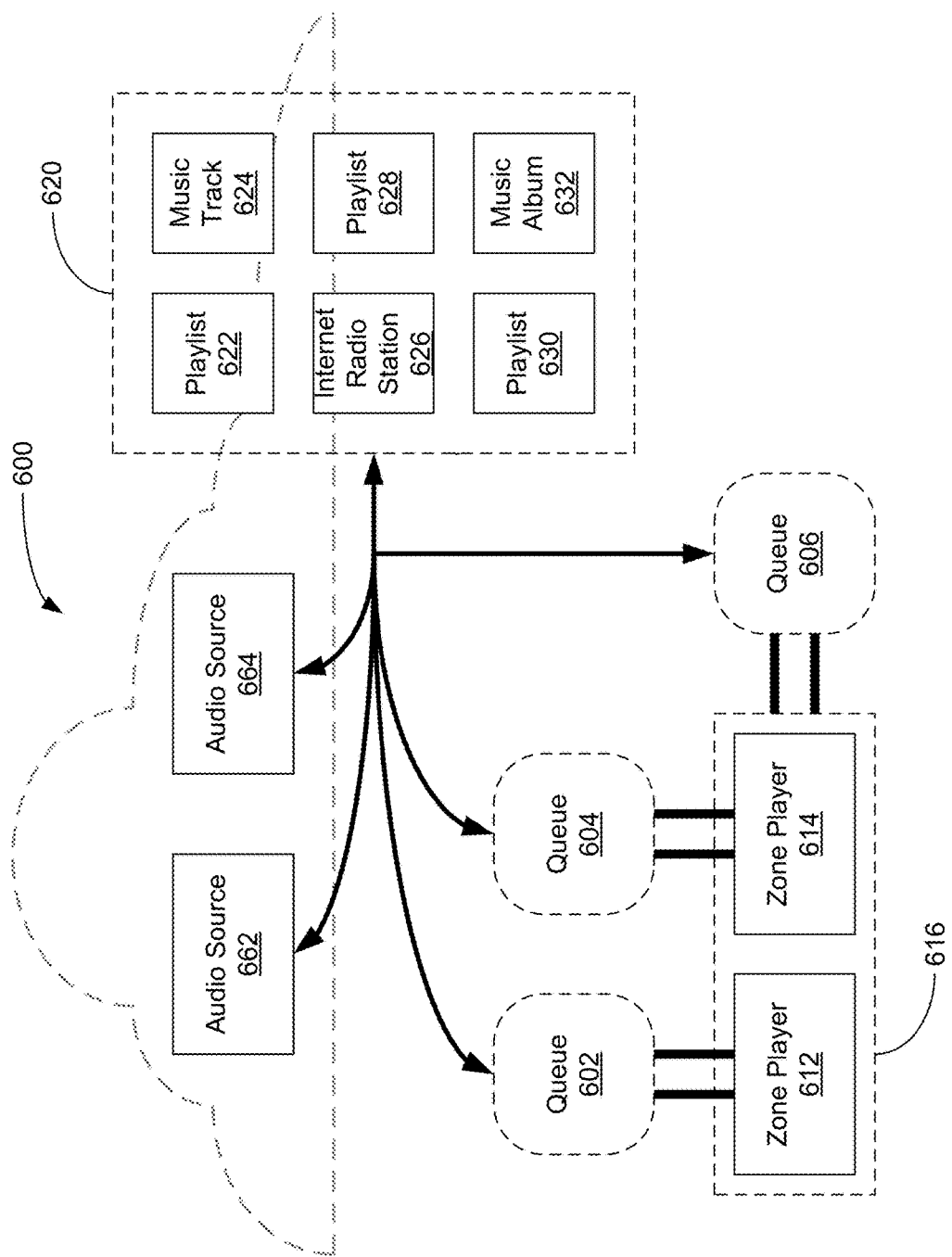
FIG. 6 shows an example playback queue configuration for a network media system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
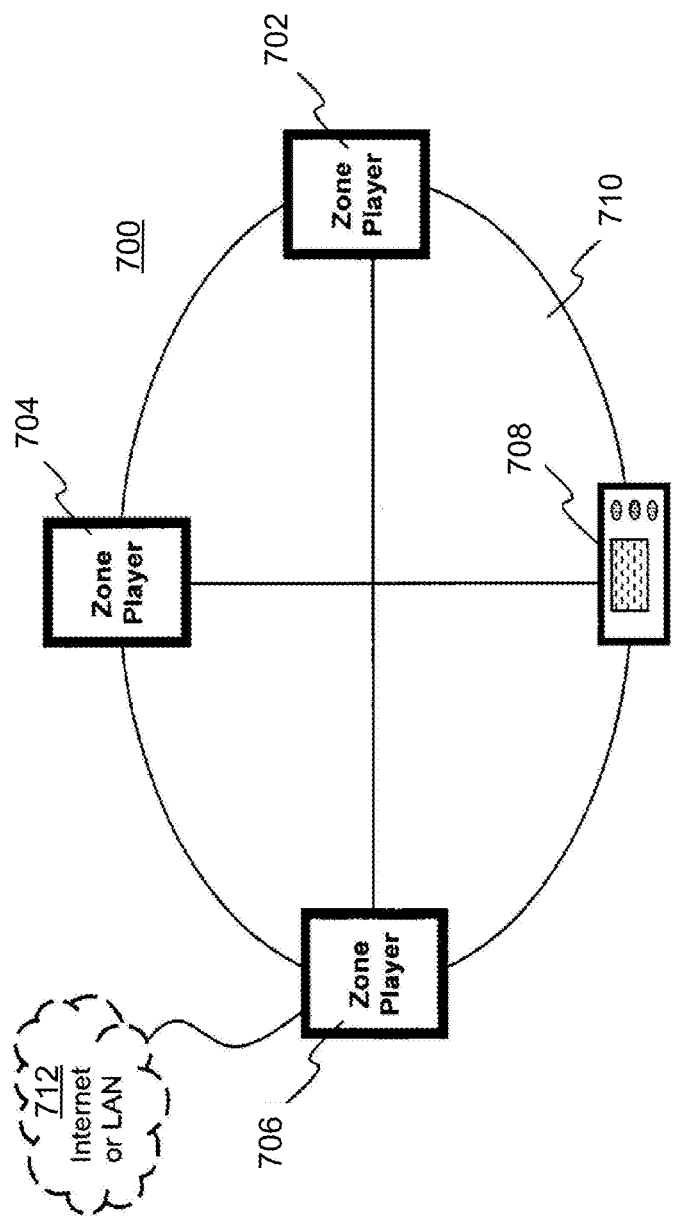
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
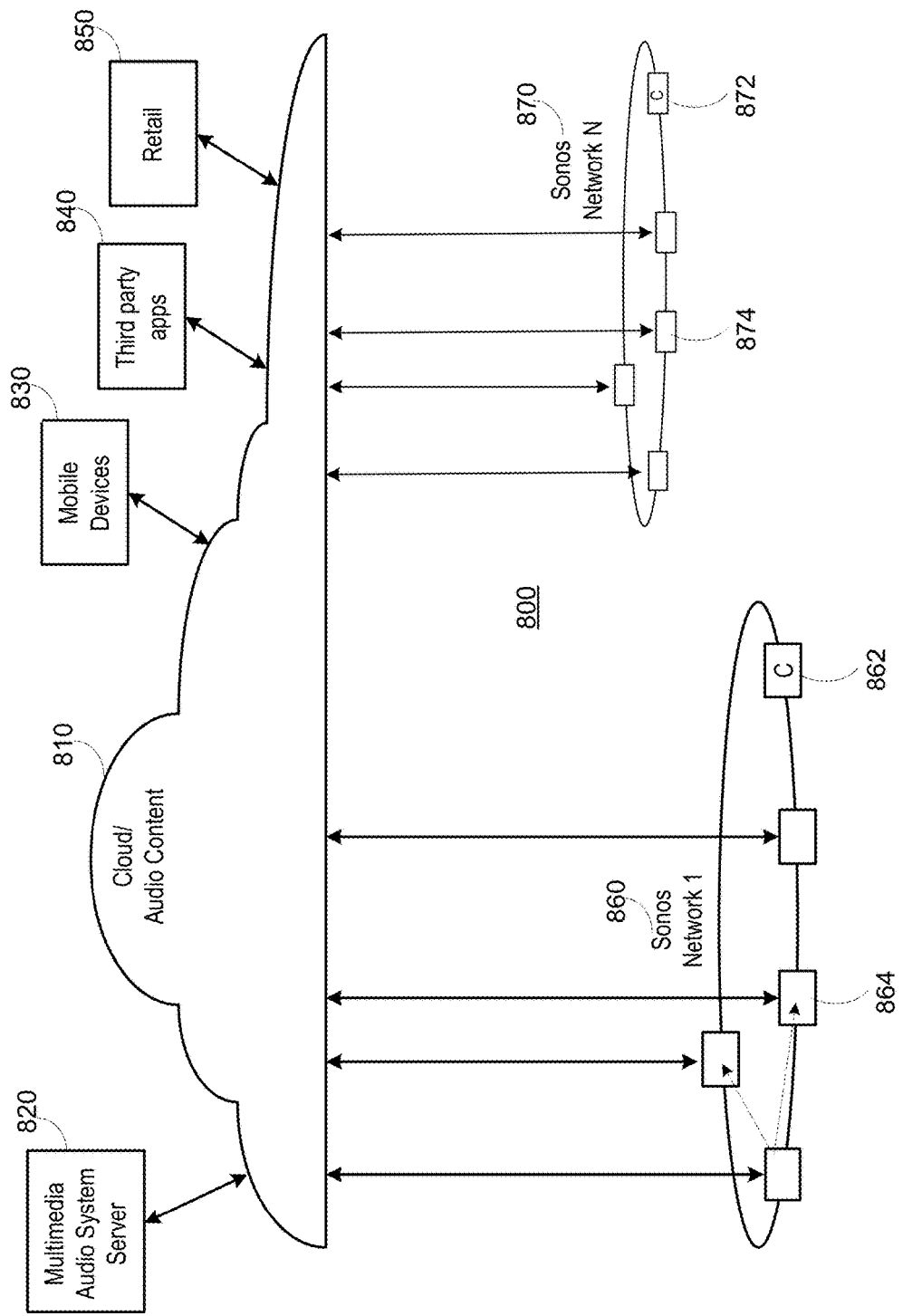
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™) a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Multi-dimensional and Cross-service Search Embodiments

Media system configuration 100 in FIG. 1, example network system 600 in FIG. 6, example network system depicted in FIG. 7, and Sonos Network 1 and N are example media playback systems in which one or more embodiments directed to multi-dimensional and/or cross-service searching can be particularly useful. Various aspects of those systems, in addition to items shown in other Figures, will be referenced below to illustrate the numerous multi-dimensional and/or cross-service search embodiments.

As will be understood from the following description and figures, advantages of the technology described herein are numerous. For instance, in one embodiment, a single user selection of a location on the user interface causes a multi-dimensional search to be performed based on metadata, such as Album, Artist, Track, Genre, Playlist, and so on, where the use of each metadata results in yet another dimension of the search. In another embodiment, a single user selection of a location on the user interface causes a cross-service search of accessible audio sources. In yet another embodiment, a single user selection of a location on the user interface causes a multi-dimensional and cross-service search. In an embodiment, a single user selection of a location on the user interface causes a same-service search, or both a same-service and a cross-service search. In another embodiment, search results are sorted for display. In one embodiment, the search results can be further sorted based on a priority associated with the metadata and audio sources. In another embodiment, the search results can also be filtered using the associated metadata based on relative positioning of the metadata to the selected location. Other embodiments are described herein.

By way of illustration, examples of a single user selection of a location include tapping a finger on a screen, tapping the screen twice quickly in the same location, touching and holding a finger on an item, dragging a finger in certain direction or starting from a certain location, pinching open or pinching close, pressing a hard button (not necessarily a soft key), or performing any other user action that is configured to cause a search.

In one example (of many) where the embodiments may prove useful, a user may be listening to a radio-style audio station (e.g., "TUNEIN™ radio", "RDIO™", "PANDORA™ Radio" and so on) over the user's media playback system and hear a song he or she likes. Traditionally, once the song is over, the user cannot listen to it again, unless of course, the radio station plays it again at some later, often unpredictable time. However, using one or more embodiments described herein, the user can select a location on the user interface that causes a search to be performed to find the song, the album, the artist, or more if so desired. The search can be multi-dimensional and over different and/or multiple audio sources, if programmed. Based on the results, the user can add the song to his or her favorites, purchase it, play it again on-demand from one of the on-demand audio sources, add it to a playlist, add it to a particular queue of the media playback system, and so on.

Figure 9:
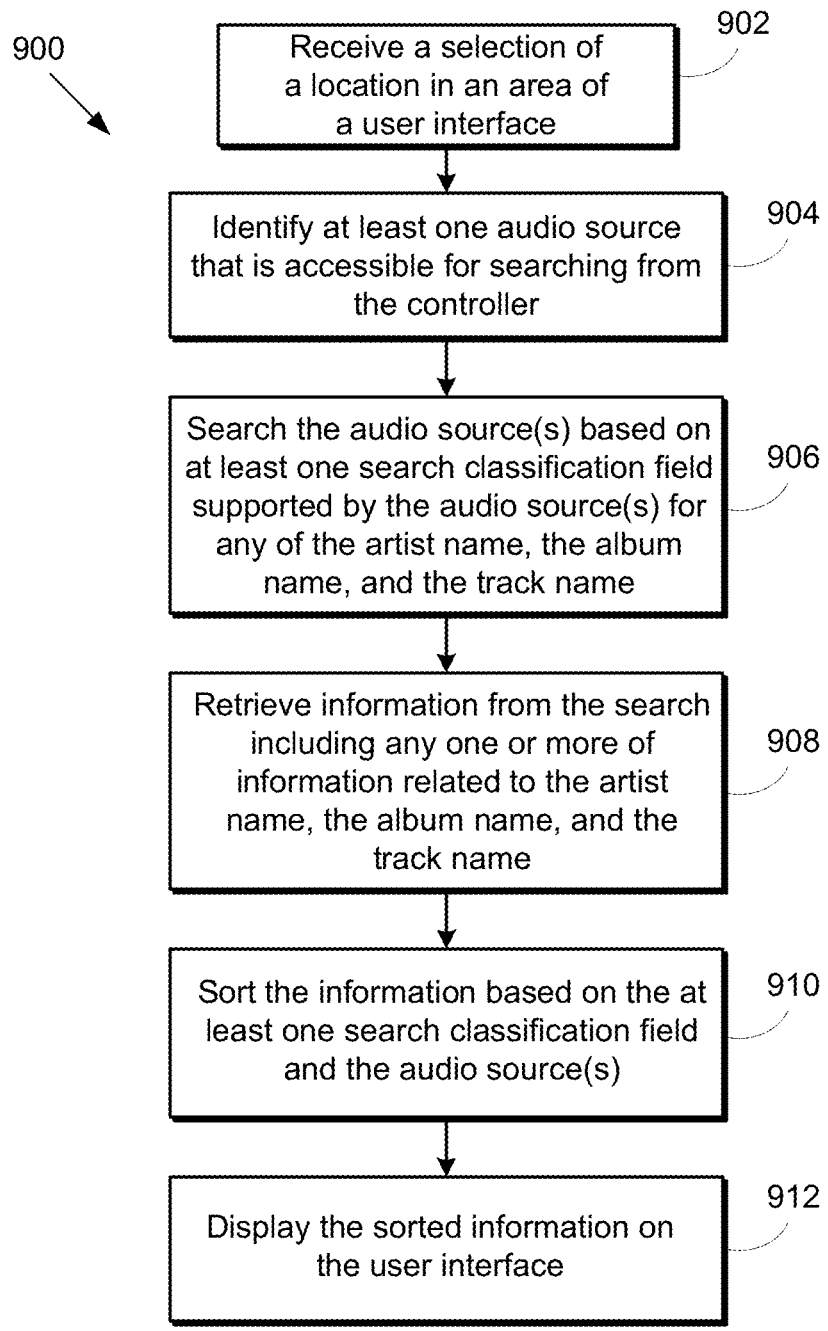
FIG. 9 shows an example flow diagram for a search in accordance with an embodiment.

Referring now to FIG. 9, in which an example process 900 for a multi-dimensional and/or a cross-service search is shown. Described more below, the process 900 includes receiving an indication or desire to perform a search, identifying one or more accessible audio sources from which to search, searching the identified audio source(s) based on (1) search classification fields supported by the audio source and (2) certain metadata, retrieving the results, sorting and displaying the results. Depending on the embodiment, process 900 may call for multiple searches to be performed in a manner that appears to happen simultaneously, or near simultaneously, to the user. For instance, an embodiment might include searching multiple, different audio sources at or near the same time from the perspective of the user.

At block 902, a controller receives a selection of a location in an area on a user interface. In this example, the selection causes or initiates a search. For purposes of illustration, controller 500 represented in FIG. 5 is an example controller that includes a screen 502 that can be used to provide a location in an area on the user interface, and input interface 514 can be used to receive a user selection of the location. The descriptions pertaining to controller 130 shown in FIG. 1, controller 708 shown in FIG. 7, and controllers 862 and 872 of FIG. 8 illustrate a type of role of the controller in example media playback systems. For instance, in some embodiments, the controller provides commands to the zone players, such as what to play, when to play, grouping, volume settings, and so on. The controller may also receive status and/or configuration information from the zone players. It is advantageous to the end-user to use the same controller to (1) control playback and (2) search audio per the process 900 of FIG. 9, because the user can, for example, directly play content resulting from the search or add the content to a playback queue, for example.

Figure 10B:
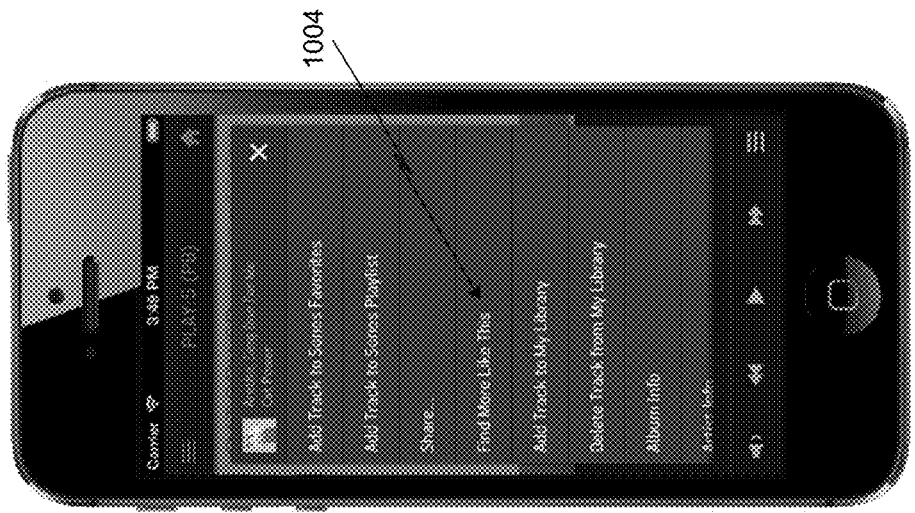
FIGS. 10A and 10B show user interface examples that help illustrate how a search may be initiated according to FIG. 9.
Figure 10A:
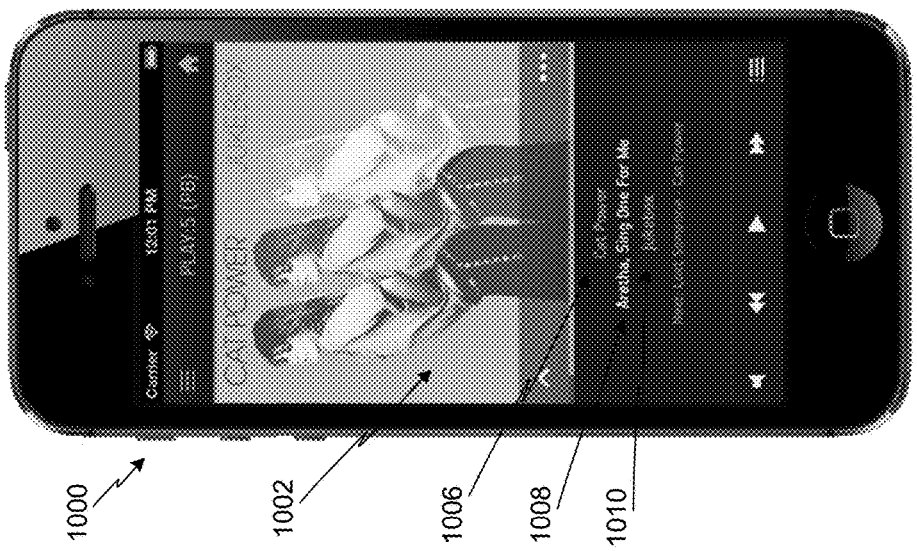

FIG. 10A shows an example user interface in accordance with an embodiment as seen on an example smartphone device. The user interface includes areas of display and locations within those areas that can be selected via a user to manage the media playback system, such as described above. In one embodiment and as shown in FIG. 10A, the "Now Playing" screen 1000 shows the current track and includes metadata that identifies artist 1006, track 1008, and album 1010 The "Now Playing" screen 1000 corresponds to what is currently playing (or currently paused or currently stopped) in a particular zone of the media playback system. In some instances, a "Now Playing" screen 1000 may show what would play by the particular zone upon receiving a play command (e.g., a zone may be in a pause or stop state, but the controller may still display a "Now Playing" screen 1000).

In one embodiment, the location for which a selection is received to cause a search is the album art 1002 shown on the Now Playing screen 1000. That is, a user can press or select any location within the album art 1002 to cause a search. In another embodiment, the location on the user interface is directly tied to any one or all of the artist name 1006, album name 1008, and track name 1010. That is, for example, the user could select "Cat Power" (the artist name 1006) to initiate a search. In an alternative example, the user could select "Aretha, Sing One For Me" (the track name 1008) to initiate a search. In yet another example, the user could select "Jukebox" (the album name 1010) to initiate a search. Other examples exist and would be understood based on this description.

FIG. 10B shows an example user interface in accordance with an embodiment as seen on an example smartphone device. Instead of (or, in addition to) initiating a search via a "Now Playing" screen, such as shown in FIG. 10A, the controller may be configured to receive a selection of a location on another screen or menu. For example, in the embodiment of FIG. 10B, the user can select the menu item "Find More Like This" at 1004 to initiate a search.

In another example (not shown in a Figure), the user can select an item displayed in a music library (e.g., local music library, RHAPSODY™ "My Library", etc.), such as an artist, album, track, etc. In some embodiments, an item displayed in a first music library may be unavailable, and a related search based on the displayed item may provide access to the content on another audio source. For example, a music service may display the complete discography for an artist, even though only a subset of the albums or tracks is available on that music service.

Figure 11:
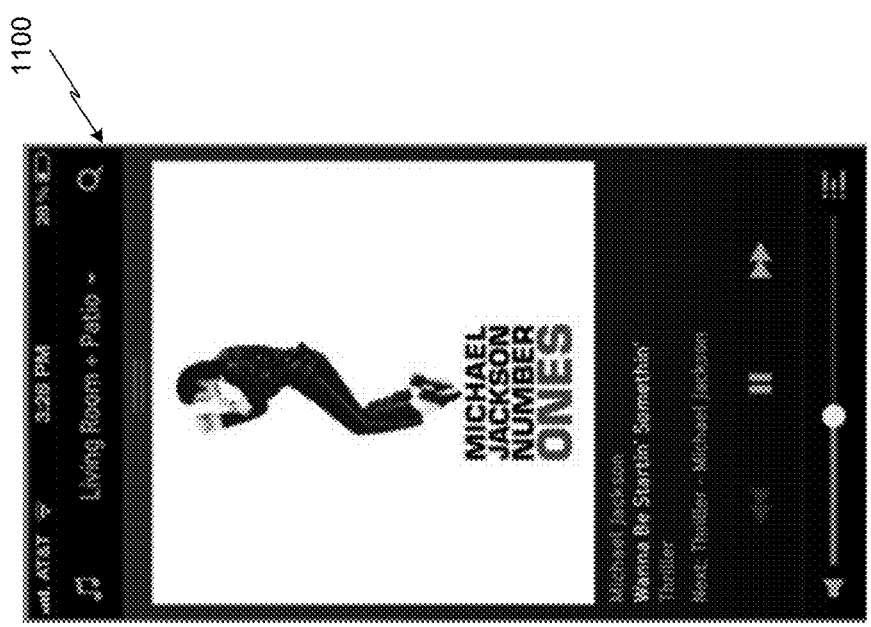
FIG. 11 shows another user interface example in which a search is initiated.

FIG. 11 shows yet another example user interface in accordance with an embodiment as seen on an example smartphone device. In this embodiment, a display element (like magnifying glass element at 1100) provides a location on the user interface that can be selected to cause a search. It is understood that a search may be initiated by more than one way, if desired.

Referring back to FIG. 9 and looking now at block 904, at least one audio source that is accessible for searching from the controller is identified. In one embodiment, the controller 500 in FIG. 5 searches memory 510 to identify at least one audio source. In another embodiment, the controller requests the audio source information from a zone player on the network. In yet another embodiment, the controller may request the audio source information from a remote server (e.g., request what audio sources are accessible by HHID). An audio source includes a data source from which audio content may be retrieved by the playback system. Examples include, but are not limited to, SPOTIFY™, RHAPSODY™ PANDORA™, ITUNES™, GOOGLE PLAY, MOG™, RDIO™, a digital music library on the local network, local radio broadcast over the Internet, and so on. It is understood that each media playback system may have (and will most likely have) a different set of one or more audio sources from which it gets audio content for playback.

In one embodiment, a list of audio sources that are accessible by the controller is stored in memory, such as in a table. For instance, the table might be stored in memory on the controller, in memory on a zone player, in memory on a remote device, or some other device. When audio sources for a given media playback system change, the table can be updated periodically or when the change occurs. In an alternative embodiment, a list of accessible audio sources is developed responsive to initiation of the search.

In some embodiments, an audio source may be accessible by the controller for searching audio content, but requires user authentication prior to playback of audio content. In some examples, user authentication is applied to the media playback system. In other examples, user authentication is applied to the controller that is used to initiate playback. In one embodiment, an audio source is searched only if the source has already been authenticated for playback. In another embodiment an audio source is searched even though the source has not yet been authenticated for playback. In some embodiments, authentication may happen after the search, if so desired.

At block 906, a search of one or more audio sources is performed based on at least one search classification field supported by the audio source(s) for any of the artist name, the album name, the track name, and any other items. Other search classification fields may be used. In some embodiments, the controller identifies the audio source(s) and determines the search classification fields supported by each source. Each source may support different classification fields. For example, PANDORA™ might support an artist search, a genre search, and a track search, whereas RDIO™ might support a station search, a show search, and a hosts search. In some embodiments, a canonical mapping is used to make sure different classification fields have meaning in each location searched. For example, "tracks" in one service may be treated the same as "songs" in another service. Similarly, "shows" may be treated the same as "podcasts". In another example, different regional services include different spelling or glyphs.

A listing of different classification fields supported by the different audio sources as a basis to search may be stored in memory, such as in a table. As an example, the table might be stored in the controller's memory, a zone player's memory, in the memory on a remote device, or some other device. If an audio source changes its supported classification fields, it may notify the controller device (or some other device), and the table can be updated in response to the notification.

To provide an example with respect to blocks 902, 904 and 906, assume that a controller identifies the following audio sources and searches the sources upon selection of a location on the user interface, where the location corresponds to the currently playing: "Cat Power" (artist), "Aretha, Sing One For Me" (track), and "Jukebox" (album):

| Identified audio sources | Supported search classification fields |
| --- | --- |
| PANDORA ™ | Artist --- "Cat Power" |
| | Genre --- |
| | Track --- "Aretha, Sing One For Me" |
| RHAPSODY ™ | Artist --- "Cat Power" |
| | Album --- "Jukebox" |
| | Track --- "Aretha, Sing One For Me" |
| | Genre --- |
| SONGZA ™ | Artist --- "Cat Power" |
| | Playlists --- |

Per block 908, the controller would retrieve information from the search including any one or more of information related to, for example, the artist name, the album name, and the track name. In some instances depending on the audio source, the search may result in finding no information for one of the classification fields. In other instances, depending on the audio source, the search may result in information for one, two, or all of the classification fields. Using the example above with respect to "Cat Power," the results from searching RHAPSODY™ under Artists might be the following, for example: "Cat Power", "Cat Power (Holiday)", "T-Power", "Cat Power & Karen Elson", "Serpent Power", and so on. Searching Rhapsody under Genres might result in no information, and searching under Tracks might including the following, for example: "Cat Power" by Patterson Hood, "That Power" by Childish Gambino, "Beat Power" by Chance's End, and so on. Results from searching PANDORA and SONGZA would also be retrieved.

Per block 910, the search results are sorted based on the at least one search classification field and the audio source(s). The results may be further sorted based on a priority scheme that may take into account, for example, multiple classification fields and/or the audio source(s) such as by placing items, which are a closer match to the search criteria, near the top. In some embodiments, results are further sorted based on user preference. For example, a user preference for studio tracks or albums over live tracks or albums may be used. In another example, tracks that have been previously 'disliked' by a user can be omitted from the results. For example, in the "Cat Power" example above, the search results could be sorted by placing items that are associated with the band "Cat Power" at the top versus material by other bands. Items associated with the band "Cat Power" may be further prioritized based on the album and/or track of interest. In another embodiment, the search results may be filtered to only include highly relevant material based on the search criteria; e.g., include material only from the band "Cat Power" and discard material from another band.

Figure 12:
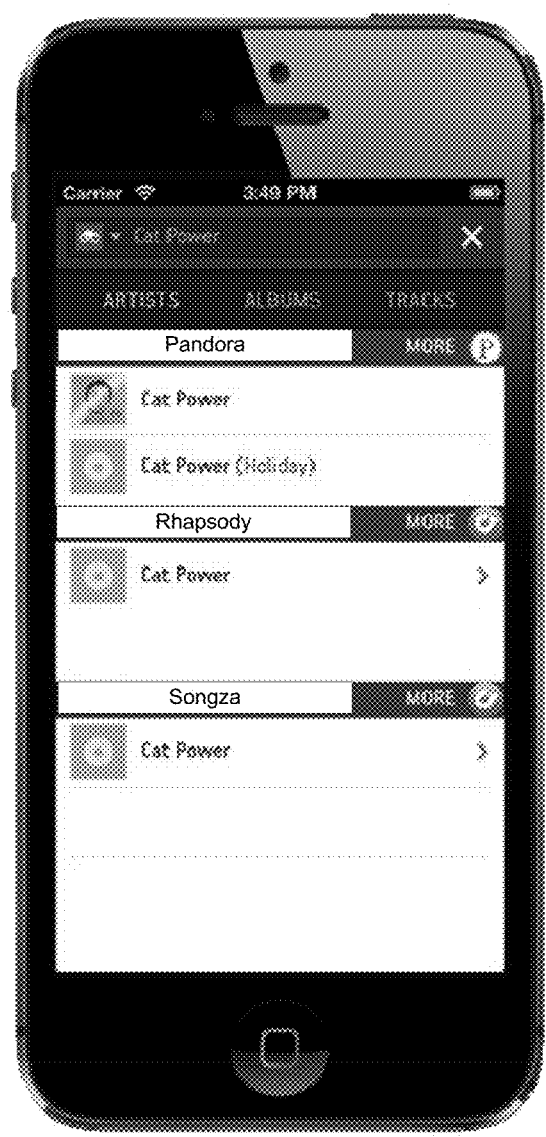
FIGS. 12, 13, 14, 15, 16, and 17 show various types of search results, as they might be displayed on a user interface, based on different kinds of searches performed.

Per block 912, the information is displayed on the user interface of the controller based on the sorting of block 910. The information may be arranged on the user interface based on the classification fields, the audio source(s), or both. Using the "Cat Power" example, the information may be displayed based on Artist, Genre, Album, Track, and Playlists. Continuing on with the example, information under the Artist category can be broken up into the audio sources, and the results from each audio source would be displayed under the respective audio source (see, for example, FIG. 12). For example:

Artist
  Pandora
    Result 1
    Result 2
  Rhapsody
    Result 1
  Songza
    Result 1

Similarly, the retrieved information may be sorted for the other classification fields and/or audio sources. If no results were found from searching a particular audio source, then the audio source may be left off the display for that classification. As described above, the results may be prioritized and/or filtered. For instance, Result 1 under Pandora might have a closer relationship to "Cat Power" than Result 2 under Pandora. Result 3 (not shown under Pandora above to illustrate the example) might have been discarded, and thus not shown, because it is too far from "Cat Power"; e.g., a different band, a different genre, and so on. Additionally, the results shown above are alphabetized, but may instead be prioritized in some embodiments based on a different algorithm. For instance, the favorite audio sources may be listed first, the audio source where the song was heard may be displayed first (e.g., same-service search; the user heard a song using a Rhapsody channel, and searched Rhapsody for the song), and so on.

Figure 13:

FIG. 13 shows an example of displaying a set of results under "Albums" from a search, in which "Jukebox" was searched on RDIO™, an audio source. Assume that the search in this example is different from the search example used above, more of which is described below. Upon selecting "Albums", the information under "RDIO" is displayed. Likewise, a user can select, with a touch of the finger for example, "Artists" or "Tracks" to view search results from the search of "Jukebox" on RDIO.

According to the example of FIG. 13, in one embodiment, only the term "Jukebox" was used in a search. For instance, the user selected a location on the user interface, such as described above (e.g., selecting album art, selecting the element "Jukebox", selecting a "Find More Like This", selecting some other element on the user interface), and the controller used "Jukebox" in the search of one or more audio sources. In FIG. 13, the audio source RDIO was searched and results under "Albums" and RDIO are displayed on the user interface. Upon selecting "Artists" and/or "Tracks" on the user interface shown in FIG. 13, additional search results corresponding to the selected category would be displayed. In another embodiment, the term "Jukebox" was used in the search, but the programmed instructions call for identifying that this "Jukebox" is associated with "Cat Power" (and even associated with "Aretha, Sing One For Me" if so programmed). If so programmed, then the results may also be prioritized by placing "Jukebox" by "Cat Power" at the top of the list. The results can be further prioritized based on a set of one or more other similarities to the Cat Power Jukebox, like genre or some other metric.

Figure 14:
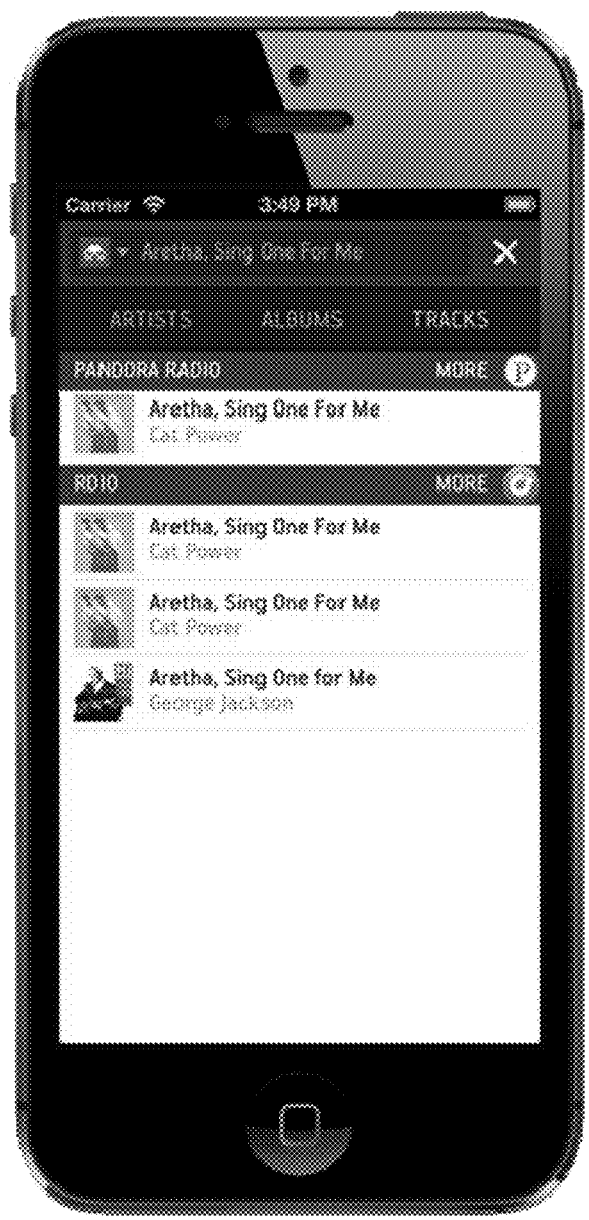

FIG. 14 shows an example of displaying a set of results under "Tracks" from a search. Upon selecting "Tracks" the information under "Pandora Radio" (an audio source) and "RDIO" (another audio source) is displayed.

Figure 15:
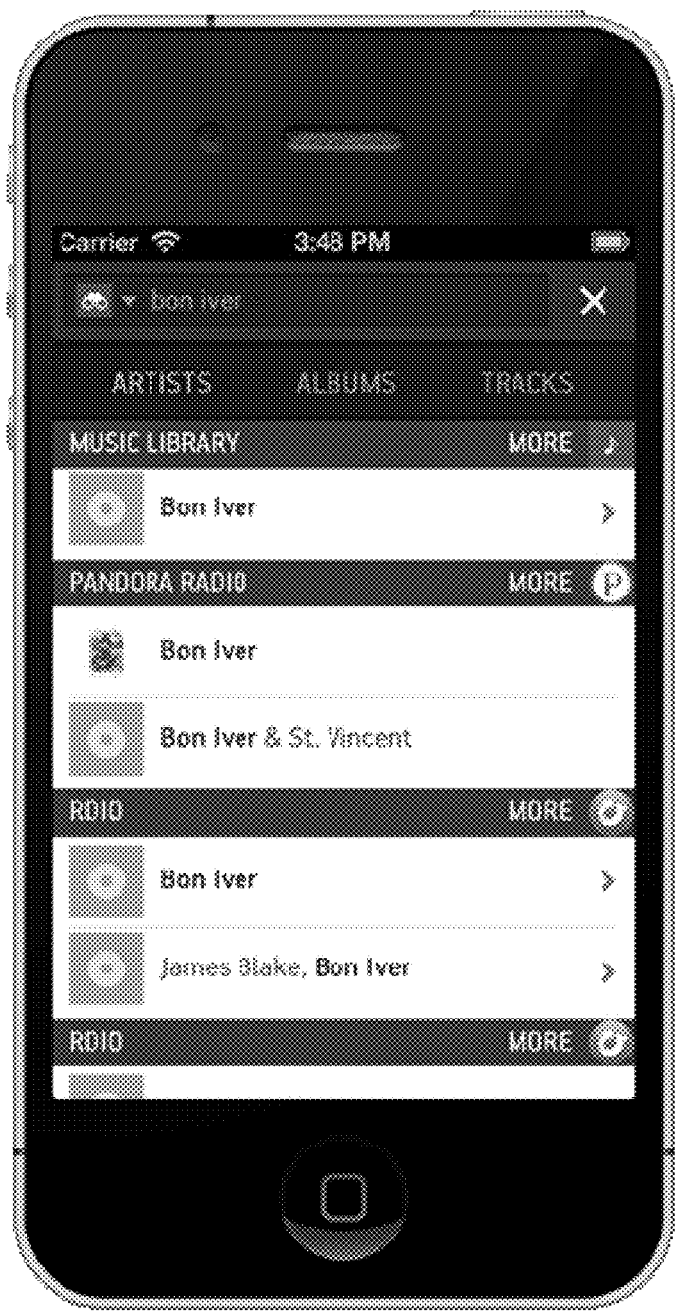

FIG. 15 shows yet another example in which a user's "Music Library" was included in a search for "Bon Iver." According to the example of FIG. 15, the information displayed corresponds to the "Artist" selection.

Figure 16:
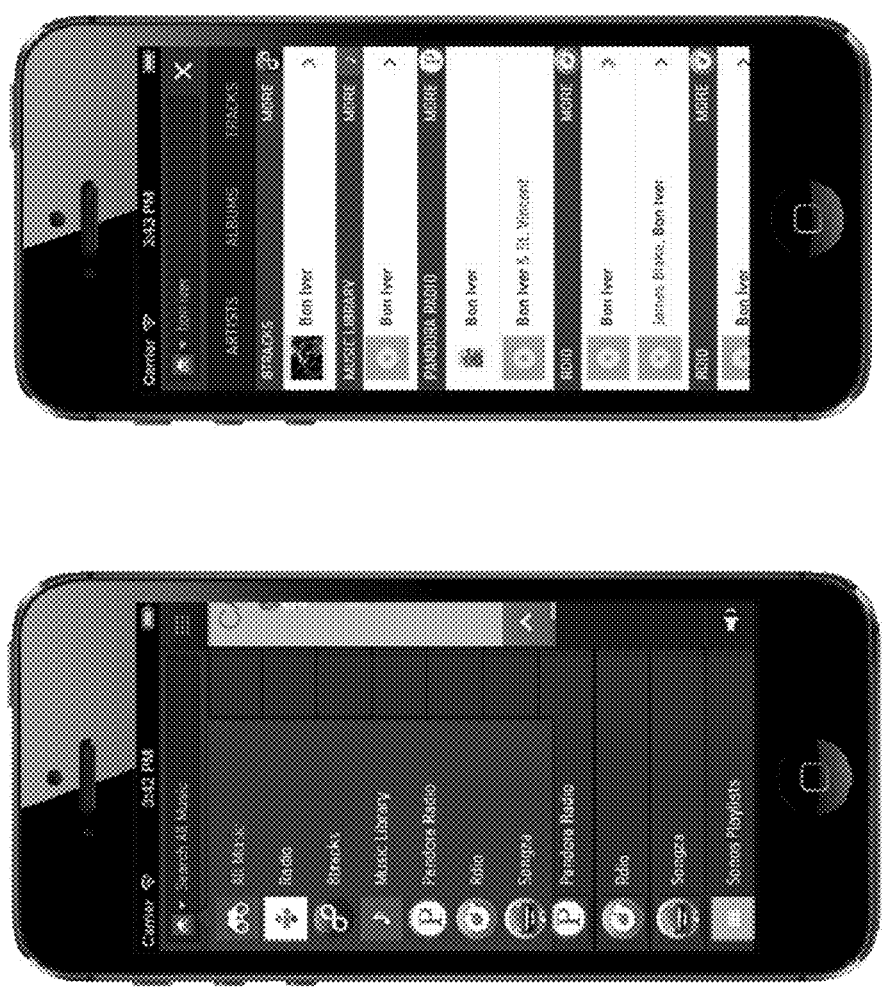
Figure 17:
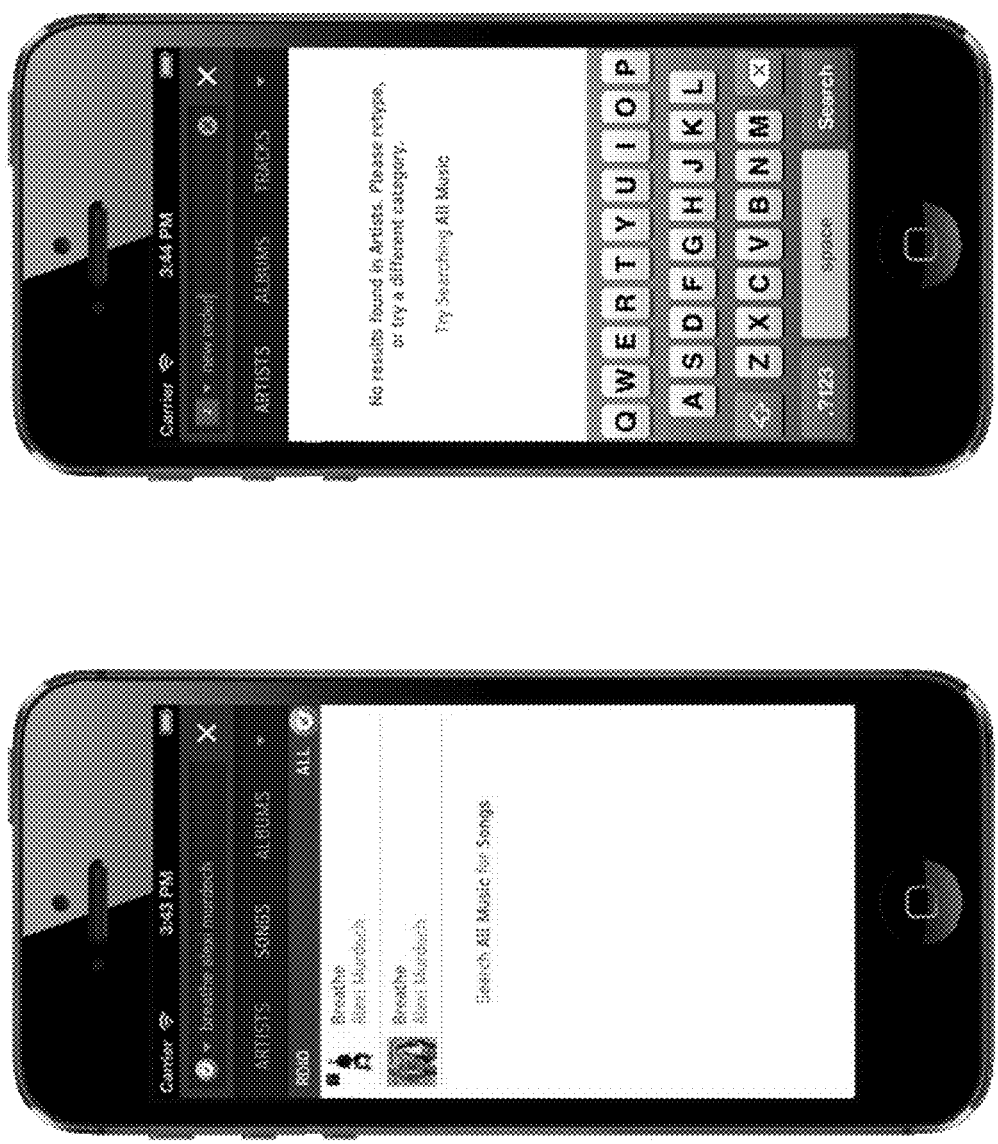

FIG. 16 shows yet another example in which the audio sources to be search may be user selected. In one instance, "all music" can be selected such that the system searches all available audio sources. One or more audio sources may be selected for searching.

In some embodiments, the results are displayed taking into consideration the screen dimension area and the number of audio sources to be displayed. In some embodiments, the results are displayed such that a minimum number of results per audio source are maintained. For example, results for two audio sources using an IPHONE™ 5 may be displayed with four results per audio source. The same search using an IPHONE™ 4 may display only three results per source. As such, in some embodiments, a determination of screen size is made by the controller prior to displaying the results.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As described above, the present application involves a playback system that causes a search to be performed responsive to a selection of a location on a user interface of a controller. In one aspect, a method is provided. The method comprises displaying an area on a user interface of a controller, the area associated with an artist name, an album name, and a track name associated with an audio track that is being played by one or more playback devices, wherein the one or more playback devices is controlled via the controller. The method also includes receiving a selection of a location in the area of the user interface, and responsive to receiving the selection of the location, identifying by the controller at least one audio source that is accessible for searching from the controller. Searching the at least one audio source based on at least one search classification field supported by the at least one audio source for any of the artist name, the album name, and the track name. Retrieving information by the controller from the at least one audio source based on the search, wherein the information includes any one or more of the following: information related to the artist name, information related to the album name, and information related to the track name; sorting the information based on the at least one search classification field and the at least one audio source; and displaying the sorted information on the user interface.

The method further includes determining the at least one search classification field that is supported by the at least one audio source; and modifying search criteria based on the at least one search classification field.

The method further includes searching a plurality of audio sources, wherein each of the plurality of audio sources is different.

The method further includes identifying an audio source of the plurality of audio sources where the controller has unrestricted access to audio content at the audio source. Examples of unrestricted access might include a service in which the playback system is registered, a local digital music library, or some other source in which at least some access to audio content is available to the playback system for playback.

The method further includes identifying an audio source of the plurality of audio sources where the controller has restricted access to the audio content at the audio source. In this instance, the search may reach to audio sources where the playback system is not yet a registered system. As such, the user can view search results, but may not have the ability to play the content until the source becomes unrestricted (e.g., via user registration).

The method further includes prioritizing the sorting of retrieved information. In one embodiment, the information is prioritized according to similarity to the artist name, the album name, or the track name. In another embodiment, the location selected on the user interface is used to determine how the information is prioritized. For example, metadata closely associated with the location may take priority in the search, the search results, and the display of such results.

A method further includes searching at least one audio source that is different from a source used to play the audio track on the one or more playback devices. For instance, the playback system might be playing a song from Pandora, and the system searches Rhapsody for audio content.

In another aspect, a device is provided. The device includes a processor, data storage, and program instructions stored in the data storage and executable by the process to display an area on a user interface of a controller, the area associated with an artist name, an album name, and a track name associated with an audio track that is being played by one or more playback devices, wherein the one or more playback devices is controlled via the controller. The device also includes executable program instructions for receiving a selection of a location in the area of the user interface, and responsive to receiving the selection of the location, identifying by the controller at least one audio source that is accessible for searching from the controller. The device further includes executable program instructions for searching the at least one audio source based on at least one search classification field supported by the at least one audio source for any of the artist name, the album name, and the track name. The device also includes executable program instructions for retrieving information by the controller from the at least one audio source based on the search, wherein the information includes any one or more of the following: information related to the artist name, information related to the album name, and information related to the track name; sorting the information based on the at least one search classification field and the at least one audio source; and displaying the sorted information on the user interface.

In yet another aspect, a non-transitory computer readable memory is provided. The non-transitory computer readable memory has stored thereon instructions executable by a computing device to cause the computing device to perform functions.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

I claim:

1. A non-transitory computer-readable medium having stored therein instructions executable by one or more processors to cause a mobile device to perform a method comprising:

registering, via one or more networks, one or more streaming services with a media playback system comprising one or more playback devices and the mobile device, the mobile device being distinct from the one or more playback devices, and wherein the registering comprises authenticating the media playback system with the one or more streaming services via at least one respective user account of the one or more streaming services;

displaying a control interface that includes one or more controls to control playback by the one or more playback devices of the media playback system;

receiving, via the control interface, search criteria for audio tracks, the search criteria including one or more of: an artist name of a first audio track that one or more playback devices are currently playing, an album name of the first audio track, a track title of the first audio track, or a search string;

responsive to receiving the search criteria, identifying at least two audio sources, wherein the at least two audio sources comprise one or more unrestricted audio sources, and wherein the one or more unrestricted audio sources comprise the registered one or more streaming services;

searching the at least two audio sources across multiple search classification fields for second audio tracks corresponding to the search criteria, wherein searching the at least two audio sources comprises sending, via a network interface of the mobile device to one or more servers over one or more second networks comprising a wide area network, one or more search queries for the second audio tracks corresponding to the search criteria;

based on the search, retrieving search results from the at least two audio sources, wherein the search results include one or more of the following: second audio tracks corresponding to the artist name of the first audio track, second audio tracks corresponding to the album name of the first audio track, second audio tracks corresponding to the track title of the first audio track, or second audio tracks corresponding to the search string;

causing the mobile device to display a tabbed control interface, each tab corresponding to a respective search classification field and including a respective list of second audio tracks matching the respective search classification field, wherein the respective second audio tracks of each list are grouped into two or more groups within the respective list according to their respective audio source of the at least two audio sources;

receiving, via the mobile device, input data representing a selection of one or more particular second audio tracks from among the second audio tracks indicated by the search results; and causing the one or more playback devices to play back the selected one or more particular second audio tracks by sending, via the network interface of the mobile device, instructions to queue respective identifiers of the selected one or more particular second audio tracks in a queue of the one or more playback devices, wherein playing back the selected one or more particular second audio tracks comprises at least one playback device of the one or more playback devices streaming the one or more particular second audio tracks from at least one of the at least two audio sources and the one or more playback devices playing the streamed one or more particular second audio tracks via one or more speakers.

2. The non-transitory computer-readable medium of claim 1, wherein receiving search criteria for audio tracks comprises:

displaying, on the control interface, an area that is associated with the audio track that is being played by the one or more playback devices of the media playback system, wherein the area indicates at least the artist name of the audio track, the album name of the audio track, and the track title of the audio track; and receiving, via the control interface, a selection of a given location within the area displayed on the control interface, the selected location corresponding to search criteria indicating one or more of: the artist name of the audio track, the album name of the audio track, and the track title of the audio track.

3. The non-transitory computer-readable medium of claim 1, wherein receiving search criteria for audio tracks comprises:

displaying, on the control interface, a search query control; and receiving, via the search query control, the search string.

4. The non-transitory computer-readable medium of claim 1, wherein identifying at least two audio sources comprises identifying one or more unrestricted audio sources that include (i) the registered one or more streaming services that provide respective libraries of streamable media items, and (ii) a media library comprising media items that are represented by respective files which are stored in one or more local data storages of the mobile device, wherein the files stored in the one or more local data storages are different from files representing the streamable media items, and wherein searching, for the search criteria, the at least two audio sources comprises searching the registered one or more streaming services and the media library.

5. The non-transitory computer-readable medium of claim 1, wherein identifying at least two audio sources comprises identifying one or more unrestricted audio sources that include (i) the registered one or more streaming services, and (ii) a media library comprising media items that are stored in one or more local data storages accessible to the mobile device via a local area network, and wherein searching, for the search criteria, the at least two audio sources comprises searching the registered one or more streaming services and the media library comprising media items that are stored in one or more local data storages accessible to the mobile device via the local area network.

6. The non-transitory computer-readable medium of claim 1, wherein identifying at least two audio sources comprises identifying one or more unrestricted audio sources that include (i) the one or more streaming services that are registered to the media playback system, and (ii) a media library comprising (a) media items that are stored in one or more local data storages accessible to the mobile device via a local area network, and (b) media items that are stored in one or more local data storages of the mobile device, and wherein searching, for the search criteria, the at least two audio sources comprises searching the one or more streaming services that are registered to the media playback system and the media library comprising (a) media items that are stored in one or more local data storages accessible to the mobile device via the local area network, and (b) media items that are stored in one or more local data storages of the mobile device.

7. The non-transitory computer-readable medium of claim 1, wherein authenticating the media playback system with the one or more streaming services via at least one respective user account of the one or more streaming services comprises:

authenticating an identifier for the media playback system with the one or more streaming services via the at least one respective user account of the one or more streaming services.

8. The non-transitory computer-readable medium of claim 1, wherein identifying at least two audio sources comprises identifying one or more restricted sources that comprise one or more streaming services which are not registered to the media playback system, and wherein searching, for the search criteria, the at least two audio sources comprises searching the one or more restricted sources and the one or more unrestricted audio sources.

9. The non-transitory computer-readable medium of claim 1, wherein the mobile device retrieved the search results from a given set of the at least two audio sources, and wherein the method further comprises:
   identifying at least one search result from each of the audio sources in the given set; and
   displaying an indication of the at least one search result from each of the audio sources in the given set such that each of the at least one search result from each of the audio sources is displayed within viewable area on the control interface.

10. A method comprising:
   registering, via a mobile device over one or more networks, one or more streaming services with a media playback system comprising one or more playback devices and the mobile device, the mobile device being distinct from the one or more playback devices, and wherein the registering comprises authenticating the media playback system with the one or more streaming services via at least one respective user account of the one or more streaming services;
   displaying, via the mobile device, a control interface that includes one or more controls to control playback by the one or more playback devices of the media playback system;
   receiving, via the control interface, search criteria for audio tracks, the search criteria including one or more of: an artist name of a first audio track that one or more playback devices are currently playing, an album name of the first audio track, a track title of the first audio track, or a search string;
   responsive to receiving the search criteria, identifying at least two audio sources, wherein the at least two audio sources comprise one or more unrestricted audio sources, and wherein the one or more unrestricted audio sources comprise the registered one or more streaming services;
   searching the at least two audio sources across multiple search classification fields for second audio tracks corresponding to the search criteria, wherein searching the at least two audio sources comprises sending, via a network interface of the mobile device to one or more servers over one or more second networks comprising a wide area network, one or more search queries for the second audio tracks corresponding to the search criteria;
   based on the search, retrieving search results from the at least two audio sources, wherein the search results include one or more of the following: second audio tracks corresponding to the artist name of the first audio track, second audio tracks corresponding to the album name of the first audio track, second audio tracks corresponding to the track title of the first audio track, or second audio tracks corresponding to the search string;
   causing the mobile device to display a tabbed control interface, each tab corresponding to a respective search classification field and including a respective list of second audio tracks matching the respective search classification field, wherein the respective second audio tracks of each list are grouped into two or more groups within the respective list according to their respective audio source of the at least two audio sources;
   receiving, via the mobile device, input data representing a selection of one or more particular second audio tracks from among the second audio tracks indicated by the search results; and
   causing the one or more playback devices to play back the selected one or more particular second audio tracks by sending, via the network interface of the mobile device, instructions to queue respective identifiers of the selected one or more particular second audio tracks in a queue of the one or more playback devices, wherein playing back the selected one or more particular second audio tracks comprises at least one playback device of the one or more playback devices streaming the one or more particular second audio tracks from at least one of the at least two audio sources and the one or more playback devices playing the streamed one or more particular second audio tracks via one or more speakers.

11. The method of claim 10, wherein receiving search criteria for audio tracks comprises:
   displaying, on the control interface, an area that is associated with the audio track that is being played by the one or more playback devices of the media playback system, wherein the area indicates at least the artist name of the audio track, the album name of the audio track, and the track title of the audio track; and
   receiving, via the control interface, a selection of a given location within the area displayed on the control interface, the selected location corresponding to search criteria indicating one or more of:
artist name of the audio track, the album name of the audio track, and the track title of the audio track.

12. The method of claim 10, wherein receiving search criteria for audio tracks comprises:
   displaying, on the control interface, a search query control; and
   receiving, via the search query control, the search string.

13. The method of claim 10, wherein identifying at least two audio sources comprises identifying one or more unrestricted audio sources that include (i) the one or more registered streaming services that provide respective libraries of streamable media items, and (ii) a media library comprising media items that are represented by respective files which are stored in one or more local data storages of the mobile device, wherein the files stored in the one or more local data storages are different from files representing the streamable media items, and wherein searching, for the search criteria, the at least two audio sources comprises searching the registered one or more streaming services and the media library.

14. The method of claim 10, wherein identifying at least two audio sources comprises identifying one or more unrestricted audio sources that include (i) the registered one or more streaming services, and (ii) a media library comprising media items that are stored in one or more local data storages accessible to the mobile device via a local area network, and wherein searching, for the search criteria, the at least two audio sources comprises searching the registered one or more streaming services and the media library comprising media items that are stored in one or more local data storages accessible to the mobile device via the local area network.

15. The method of claim 10, wherein identifying at least two audio sources comprises identifying one or more unrestricted audio sources that include (i) the one or more registered streaming services, and (ii) a media library comprising (a) media items that are stored in one or more local data storages accessible to the mobile device via a local area network, and (b) media items that are stored in one or more local data storages of the mobile device, and wherein searching, for the search criteria, the at least two audio sources comprises searching the registered one or more streaming services and the media library comprising (a) media items that are stored in one or more local data storages accessible to the mobile device via the local area network, and (b) media items that are stored in one or more local data storages of the mobile device.

16. The method of claim 10, wherein authenticating the media playback system with the one or more streaming services via at least one respective user account of the one or more streaming services comprises:
authenticating an identifier for the media playback system with the one or more streaming services via the at least one respective user account of the one or more streaming services.

17. The method of claim 10, wherein identifying at least two audio sources comprises identifying one or more restricted sources that comprise one or more streaming services which are not registered to the media playback system, and wherein searching, for the search criteria, the at least two audio sources comprises searching the one or more restricted sources and the one or more unrestricted audio sources.

18. The method of claim 10, wherein the mobile device retrieved the search results from a given set of the at least two audio sources, and wherein the method further comprises:
identifying at least one search result from each of the audio sources in the given set; and
displaying an indication of the at least one search result from each of the audio sources in the given set such that each of the at least one search result from each of the audio sources is displayed within viewable area on the control interface.

19. A mobile device comprising:
a network interface;
one or more processors; and
tangible, non-transitory, computer-readable media having instructions encoded therein, wherein the instructions, when executed by the one or more processors, cause the mobile device to perform a method comprising:
registering, via one or more networks, one or more streaming services with a media playback system comprising one or more playback devices and the mobile device, the mobile device being distinct from the one or more playback devices, and wherein the registering comprises authenticating the media playback system with the one or more streaming services via at least one respective user account of the one or more streaming services;
displaying a control interface that includes one or more controls to control playback by the one or more playback devices of the media playback system;
receiving, via the control interface, search criteria for audio tracks, the search criteria including one or more of: an artist name of a first audio track that one or more playback devices are currently playing, an album name of the first audio track, a track title of the first audio track, or a search string;
responsive to receiving the search criteria, identifying at least two audio sources, wherein the at least two audio sources comprise one or more unrestricted audio sources, and wherein the one or more unrestricted audio sources comprise the registered one or more streaming services;

searching the at least two audio sources across multiple search classification fields for second audio tracks corresponding to the search criteria, wherein searching the at least two audio sources comprises sending, via the network interface of the mobile device to one or more servers over one or more second networks comprising a wide area network, one or more search queries for the second audio tracks corresponding to the search criteria;
based on the search, retrieving search results from the at least two audio sources, wherein the search results include one or more of the following: second audio tracks corresponding to the artist name of the first audio track, second audio tracks corresponding to the album name of the first audio track, second audio tracks corresponding to the track title of the first audio track, or second audio tracks corresponding to the search string;
causing the mobile device to display a tabbed control interface, each tab corresponding to a respective search classification field and including a respective list of second audio tracks matching the respective search classification field, wherein the respective second audio tracks of each list are grouped into two or more groups within the respective list according to their respective audio source of the at least two audio sources;
receiving, via the mobile device, input data representing a selection of one or more particular second audio tracks from among the second audio tracks indicated by the search results; and
causing the one or more playback devices to play back the selected one or more particular second audio tracks by sending, via the network interface of the mobile device, instructions to queue respective identifiers of the selected one or more particular second audio tracks in a queue of the one or more playback devices, wherein playing back the selected one or more particular second audio tracks comprises at least one playback device of the one or more playback devices streaming the one or more particular second audio tracks from at least one of the at least two audio sources and the one or more playback devices playing the streamed one or more particular second audio tracks via one or more speakers.

20. The mobile device of claim 19, wherein identifying at least two audio sources comprises identifying one or more unrestricted audio sources that include (i) the registered one or more streaming services, and (ii) a media library comprising (a) media items that are stored in one or more local data storages accessible to the mobile device via a local area network, and (b) media items that are stored in one or more local data storages of the mobile device, and wherein searching, for the search criteria, the at least two audio sources comprises searching the registered one or more streaming services and the media library comprising (a) media items that are stored in one or more local data storages accessible to the mobile device via the local area network, and (b) media items that are stored in one or more local data storages of the mobile device.

21. The mobile device of claim 19, wherein identifying at least two audio sources comprises identifying one or more restricted sources that comprise one or more streaming services which are not registered to the media playback system, and wherein searching, for the search criteria, the at least two audio sources comprises searching the one or more restricted sources and the one or more unrestricted audio sources.

\* \* \* \* \*